(12) United States Patent
Han

(10) Patent No.: US 8,504,799 B2
(45) Date of Patent: Aug. 6, 2013

(54) ROM DATA PATCH CIRCUIT, EMBEDDED SYSTEM INCLUDING THE SAME AND METHOD OF PATCHING ROM DATA

(75) Inventor: Dong-Hee Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1947 days.

(21) Appl. No.: 11/671,534

(22) Filed: Feb. 6, 2007

(65) Prior Publication Data
US 2007/0220374 A1    Sep. 20, 2007

(30) Foreign Application Priority Data

Feb. 21, 2006 (KR) .......................... 10-2006-0016609

(51) Int. Cl.
*G06F 12/00* (2006.01)
(52) U.S. Cl.
USPC ............................. 711/220; 711/102; 717/168
(58) Field of Classification Search
USPC .................... 711/102, 220; 717/168
See application file for complete search history.

(56) References Cited

U.S. PATENT DOCUMENTS

| | | | |
|---|---|---|---|
| 5,619,678 A | 4/1997 | Yamamoto et al. | |
| 5,757,690 A | 5/1998 | McMahon | |
| 5,938,774 A * | 8/1999 | Hsu | 714/6.1 |
| 5,940,850 A | 8/1999 | Harish et al. | |
| 6,438,664 B1 * | 8/2002 | McGrath et al. | 711/154 |
| 6,874,073 B2 * | 3/2005 | Mahrla | 711/159 |
| 2002/0124161 A1 * | 9/2002 | Moyer et al. | 712/234 |
| 2004/0210720 A1 * | 10/2004 | Wong et al. | 711/132 |
| 2007/0198787 A1 * | 8/2007 | Jessani et al. | 711/159 |
| 2008/0112205 A1 * | 5/2008 | Saado | 365/94 |

FOREIGN PATENT DOCUMENTS

KR    1020000013076    3/2000

OTHER PUBLICATIONS

English Abstract for Publication No. 1020000013076.

* cited by examiner

*Primary Examiner* — Kalpit Parikh
(74) *Attorney, Agent, or Firm* — F. Chau & Associates, LLC

(57) ABSTRACT

A read only memory (ROM) data patch circuit replaces ROM data stored in N modified ROM data blocks with patch data stored in N random access memory (RAM) patch blocks based on patch information. The ROM data patch circuit includes a data patch detecting unit, a RAM address generating unit, and an address selecting unit. The data patch detecting unit generates N offset select signals and an address select signal. The N offset select signals indicate which block a read ROM address belongs to, and the address select signal represents whether the read ROM address belongs to any of the N modified ROM data blocks. The RAM address generating unit generates a read RAM address corresponding to the read ROM address based on the offset select signals. The address selecting unit outputs one of the read ROM address and the read RAM address based on the address select signal.

23 Claims, 5 Drawing Sheets

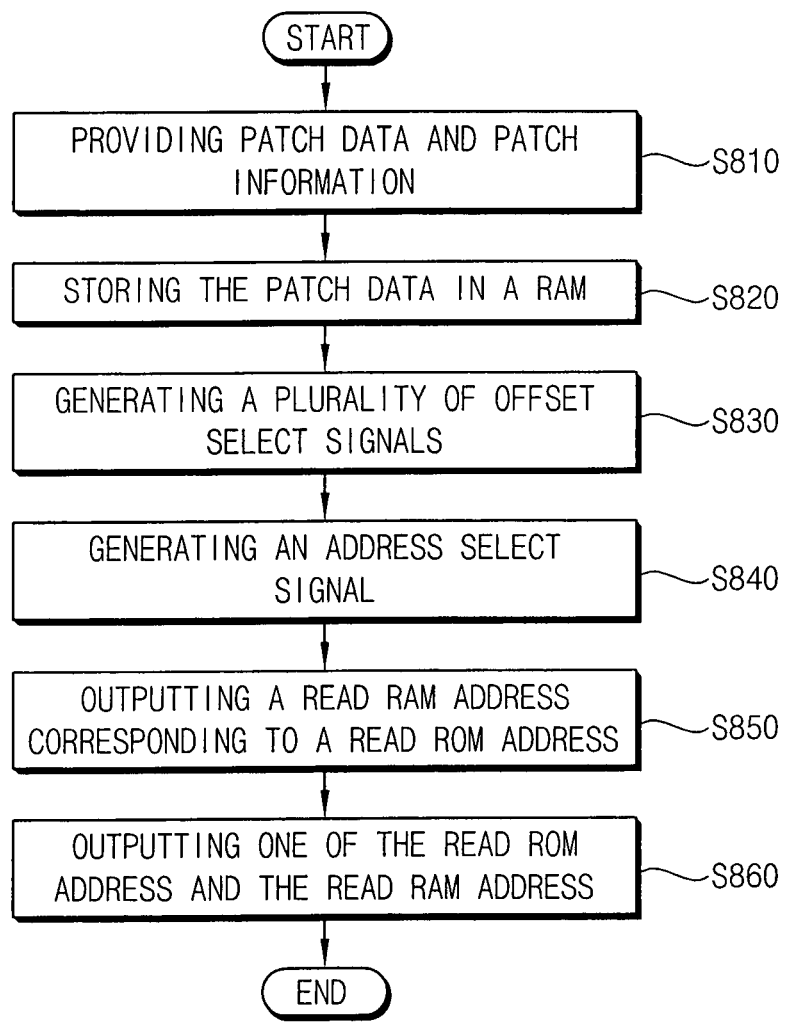

ROM DATA PATCH CIRCUIT, EMBEDDED SYSTEM INCLUDING THE SAME AND METHOD OF PATCHING ROM DATA

CROSS-REFERENCE TO RELATED APPLICATIONS

This application clams priority under 35 USC §119 to Korean Patent Application No. 2006-16609 filed on Feb. 21, 2006, in the Korean Intellectual Property Office, the disclosure of which is incorporated herein in its entirety by reference.

BACKGROUND OF THE INVENTION

1. Field of the Invention

The present invention relates to a semiconductor device, and more particularly to a ROM data patch circuit, an embedded system including the same and a method of patching ROM data.

2. Description of Related Art

An embedded system typically includes a microprocessor for controlling a system such as a mechanical apparatus, an electronic apparatus, etc. The embedded system may be implemented, typically, in a form of one-chip. Software for operating an apparatus is not read from an external memory, but is stored in the chip of the embedded system.

A typical embedded system stores programs to be executed and data used in operating the system in a read only memory (ROM). The use of a random access memory (RAM), as opposed to ROM, would enable the modification of the stored programs and the data. However, the production cost of an embedded system including RAM as a storage device is relatively high in comparison with an embedded system including ROM as a storage device.

Accordingly, in a typical embedded system, programs and data are stored in a RAM for system development, and then stored in a ROM after system development is completed.

FIG. 1 is a block diagram illustrating a data access path of an embedded system.

Referring to FIG. 1, the embedded system 100 includes a processor 110, a in program ROM 120, a data ROM 130, and a RAM 140. The processor 110 outputs a read ROM address through an address bus 160 to read programs and data stored in the ROMs 120 and 130. The read program code and the read data are transferred to the processor 110 through a data bus 150 or stored in the RAM 140.

After system development is completed, the program and/or the data may need to be modified or upgraded, for example, in a case where an error occurs in the program codes or the data stored in the ROM is to be modified or upgraded for improving system performance.

In these and other cases, discarding already manufactured products and manufacturing new chips for storing modified program codes and data is inefficient. In addition, because program codes and data are stored in the ROM during the manufacturing process of semiconductor memory devices, changing the manufacturing process for a new chip incurs time and monetary costs. Therefore, it can be difficult when a portion of the data and programs stored in the ROM needs to be modified with patch program codes and/or patch data using already established products.

As disclosed in U.S. Pat. No. 5,940,850, an apparatus and a method of patching programs stored in the ROM are available, but an apparatus and a method of patching data stored in the ROM is not widely used. Because the data stored in the ROM are in a form of a fixed table value, the possibility of error is relatively low. The possibility of error, however, is not zero, and as described above, and upgrades to the data stored in the ROM are needed so as to improve system performance etc.

A method of patching data stored in the ROM may be similar to a method of patching a program. In case of patching a program, a method for determining a start address of a program block to be modified and shifting the start address of the ROM to a corresponding address of a RAM is needed. In case of patching data, however, a complex comparator is needed because a data block may not be definitely defined. For complex data patch circuits, outputting a read address to an address bus after a read command may be delayed, and such a delay may degrade performance of the system.

Therefore, an apparatus and a method of patching ROM data are needed, in which an already established data ROM may be used without degrading system performance.

SUMMARY OF THE INVENTION

According to an exemplary embodiment of the present invention a ROM data patch circuit replaces ROM data stored in N (N is a natural number) modified ROM data blocks with patch data stored in N RAM patch blocks based on patch information. The ROM data patch circuit includes a data patch detecting unit a RAM address generating unit, and an address selecting unit. The data patch detecting unit generates N offset select signals and an address select signal. The N offset select signals indicate which block among the N modified ROM data blocks a read ROM address belongs to, and the address select signal in represents whether the read ROM address belongs to any of the N modified ROM data blocks. The RAM address generating unit generates a read RAM address corresponding to the read ROM address based on the offset select signals. The address selecting unit outputs one of the read ROM address and the read RAM address based on the address select signal.

The patch information includes N start addresses of the N modified ROM data blocks. N data block lengths, N offsets and a patch enable signal for controlling a patch operation. Each of the N offsets represents each difference between an address of the modified ROM data block and an address of the corresponding RAM patch block. The ROM data patch circuit may further include a register for storing the patch information. The address select signal may be logic high when the read ROM address belongs to any of the N modified ROM data blocks and the patch enable signal is logic high, and the address select signal may be logic low when the read ROM address does not belong to any of the N modified ROM data blocks or the patch enable signal is logic low.

The data patch detecting unit includes N comparator units, an OR gate and a first AND gate. The N comparator units respectively generate the offset select signals being logic high when the read ROM address belongs to a corresponding modified ROM data block and logic tow when the read ROM address does not belong to the corresponding modified ROM data block. The OR gate performs an OR operation on the N offset select signals generated from the N comparator units. The first AND gate performs an AND operation on the output in signal of the OR gate and the patch enable signal to generate the address select signal.

Each of the N comparator units for example a K-th comparator unit of the N comparator units (K is a natural number not more than N), may include a tower limit comparator, an adder, an upper limit comparator and a second AND gate. The lower limit comparator outputs a first signal of logic high when the read ROM address is not less than a K-th start address of the N start addresses. The adder outputs a sum of the K-th start address and a K-th data block length of the N data block lengths. The upper limit comparator outputs a second signal of logic high when the read ROM address is not more than the output of the adder. The second AND gate performs the AND operation on the first signal and the second signal to generate a Koch offset select signal of the N offset select signals.

The RAM address generating unit may include an offset selector and an offset adder. The offset selector outputs the offset corresponding to the modified ROM data block to which the read ROM address belongs, among the N offsets, based on the N offset select signals. The offset adder outputs the read RAM address by summing the read ROM address and the offset outputted from the offset selector.

The address selecting unit selects and outputs the read ROM address when the patch enable signal is logic low, regardless of whether the read ROM address belongs to any of the N modified ROM data blocks. The address selecting unit may include a multiplexer outputting one of the read ROM address and the read RAM address based on the address select signal.

According to an exemplary embodiment of the present invention, an embedded system includes a processor, a data ROM storing data processed by the processor, a RAM storing patch data for replacing data stored in the data ROM, a register for storing patch information, and a ROM data patch circuit outputting one of a read ROM address and a read RAM address corresponding to the read ROM address based on the patch information and the read ROM address. The patch data may be provided from an external programmable ROM and stored in the RAM during booting process.

According to an exemplary embodiment of the present invention, a method of patching ROM data includes providing patch data and patch information for replacing the data stored in N modified ROM data blocks, storing the patch data in N RAM patch blocks, respectively, and outputting one of a read ROM address and a read RAM address corresponding to the read ROM address based on the patch information and the read ROM address. The method of patching ROM data may further include storing the patch information in a register.

The outputting one of the read RAM address and the read ROM address comprises may include generating N offset select signals indicating which block among the N modified ROM data blocks a read ROM address belongs to generating an address select signal representing whether or not the read ROM address belongs to any of the N modified ROM data blocks, generating the read RAM address corresponding to the read ROM address based on the offset select signals and outputting one of the read ROM address and the read RAM address in based on the address select signal.

BRIEF DESCRIPTION OF THE DRAWINGS

The present invention will become more apparent by describing in detail exemplary embodiments thereof with reference to the accompanying drawings, in which:

FIG. 8 is a flow chart illustrating a method of patching ROM data according to an exemplary embodiment of the present invention.

DETAILED DESCRIPTION OF PREFERRED EMBODIMENTS

Figure 1:
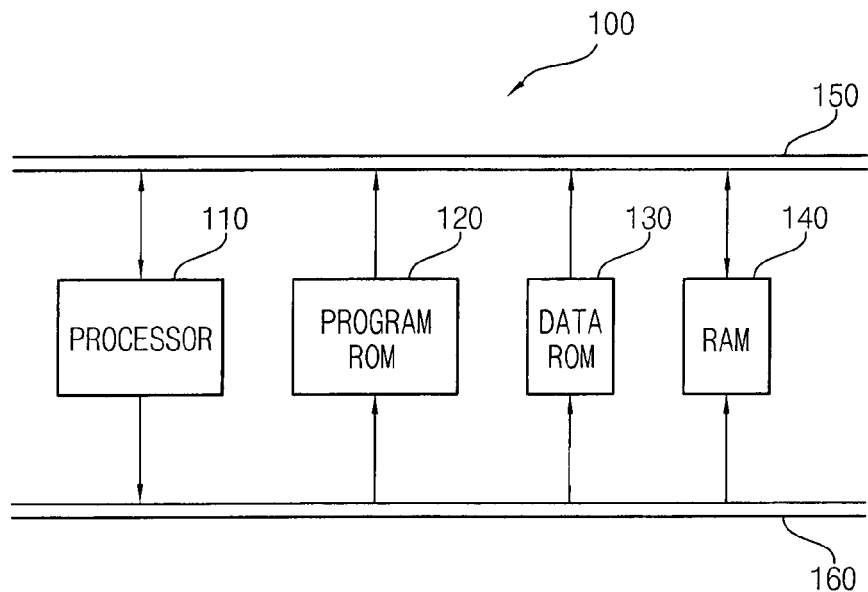
FIG. 1 is a block diagram illustrating a data access path of a conventional embedded system.

Embodiments of the present invention now will be described more fully with reference to the accompanying drawings, in which embodiments of the invention are shown. This invention may, however, be embodied in many different forms and should not be construed as limited to embodiments set forth herein, Rather, embodiments are provided so that this disclosure will be thorough and complete, and will fully convey the scope of the invention to those skilled in the art. Like reference numerals refer to like elements throughout this application.

Figure 2:
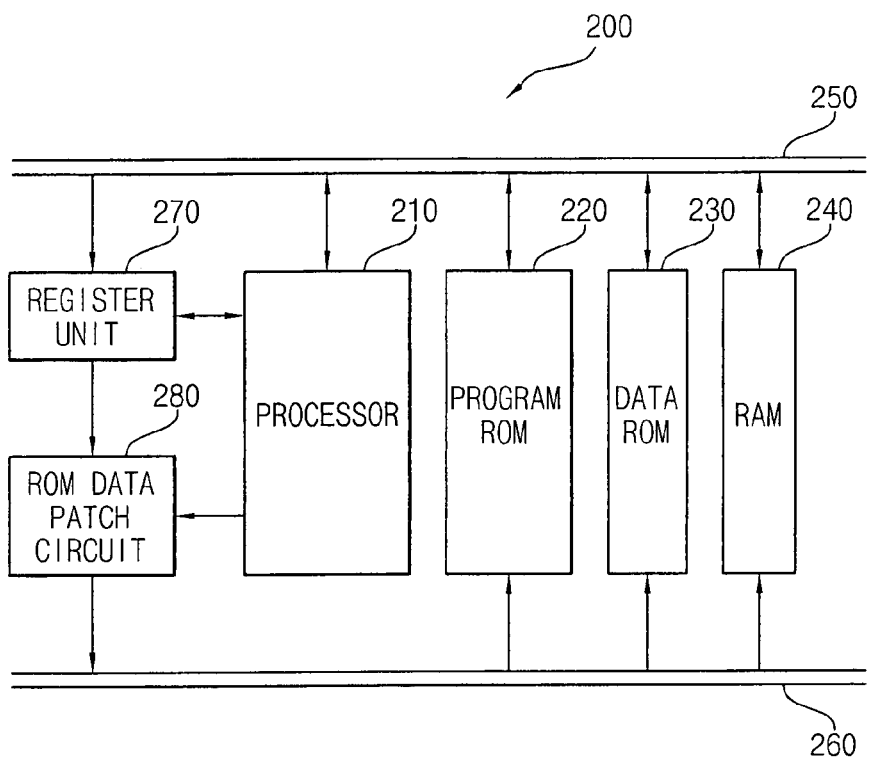
FIG. 2 is a block diagram illustrating an embedded system including a ROM data patch circuit according to an exemplary embodiment of the present invention.

FIG. 2 is a block diagram illustrating an embedded system including a ROM data patch circuit according to an exemplary embodiment of the present invention.

Referring to FIG. 2, the embedded system 200 includes a processor 210, a program ROM 220, a data ROM 230, a RAM 240, a register unit 270 and a ROM data patch circuit 280.

The processor 210 controls the embedded system 200 through a data bus 250 and an address bus 260. The processor 210 performs various operations needed for system operation and outputs a read address or a write address through the address bus 260. Program code or data stored at the read address of the ROM 220 and 230 or at the read address of the RAM 240 are transmitted through the data bus 250. In addition, the data to be written at the write address in of the RAM 240 are transmitted to the RAM 240 through the data bus 250.

The program ROM 220 and the data ROM 230 may be distinct memory devices physically separated or may be distinct spaces logically separated within a memory device.

A modified ROM data block is defined as a logical space of the data ROM 230, in which the ROM data to be modified are stored. A RAM patch block is defined as a logical space of the RAM 240, in which patch data for replacing the data in the modified ROM data block are stored. There may be a plurality of modified ROM data blocks and RAM patch blocks. The length of each modified ROM data block is equal to the length of a corresponding RAM patch block.

The patch data may be stored in a programmable ROM. The patch data stored in the programmable ROM may be loaded in the RAM patch block of the RAM 230 during a booting process of the embedded system 200 in a case where an error has been corrected to the data has been upgraded.

The register unit 270 stores patch information for replacing data, and the ROM data patch circuit 280 outputs one of a read ROM address and a read RAM address corresponding to the read ROM address based on the patch information and the read ROM address. A detailed structure and operation of the ROM data patch circuit 280 is described later.

The patch information may include start addresses of the RAM patch blocks, data block lengths, offsets and a patch enable signal for controlling patch operation. Each of the offsets represents a difference between an address of the modified ROM data block and an address of the corresponding RAM patch block. The start addresses and the data block lengths are stored in the programmable ROM with the patch data, and may be loaded in the register unit 270 during the booting process of the embedded system 200. During the booting process of the embedded system 200, the processor 210 detects the offsets after the patch data are loaded and stores the detected offsets into the register unit 270.

Figure 3:
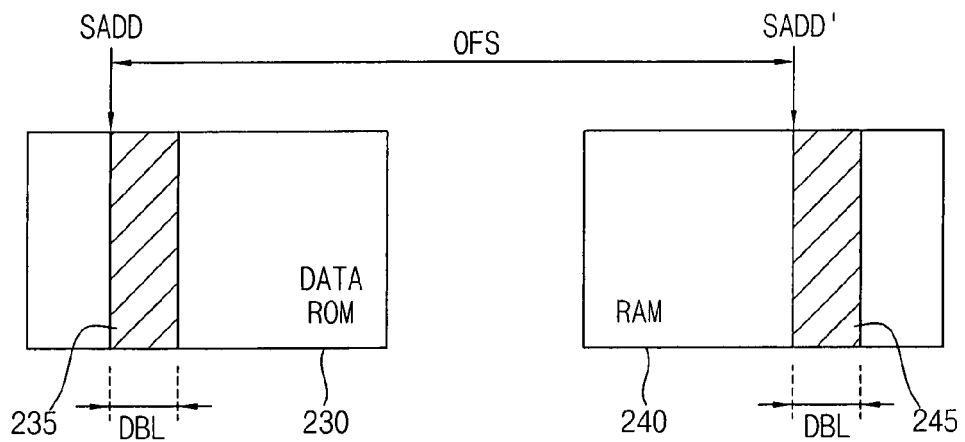
FIG. 3 is a diagram for describing a relationship between a modified ROM data block and a corresponding RAM patch block.

FIG. 3 is a diagram for describing a relationship between a modified ROM data block and a corresponding RAM patch block. Although one modified ROM data block is illustrated in FIG. 3, there may exist a plurality of modified ROM data blocks in a ROM.

Referring to FIG. 3S the offset OFS represents a difference between the start address SADD of the modified ROM data block 235 and the start address SADD of the corresponding RAM patch block. The modified ROM data block stores the ROM data to be modified, and the RAM patch block 245 stores the patch data for replacing the data stored in the modified ROM data block. As described above, a magnitude of the ROM data to be modified and a magnitude of the corresponding patch data are identical to each other. Therefore, the data block length DBL of the modified ROM data block 235 and the data block length DBL of the corresponding RAM patch block 245 are identical to each other. The patch data are stored at the read RAM address that may be calculated by adding the offset OFS to the read ROM address where the corresponding ROM data are stored.

Accordingly, to read the patch data instead of the ROM data, it is enough to output the corresponding read RAM address instead of the read ROM address in to the address bus. The other operations are the same as the conventional data processing operations. That is, when the read command is received with respect to the read ROM address included in the modified ROM data block 235, the ROM data stored at the read ROM address can be replaced with the patch data by outputting the read RAM address to the address bus, where the read RAM address corresponds to the read ROM address added by the offset.

In case that there are N (N is a natural number) modified ROM data blocks 235, N start addresses SADD, N data block lengths and N offsets are needed, respectively. This patch information is provided to the embedded system 200 during the booting process, and may be stored at the register unit 270.

Figure 4:
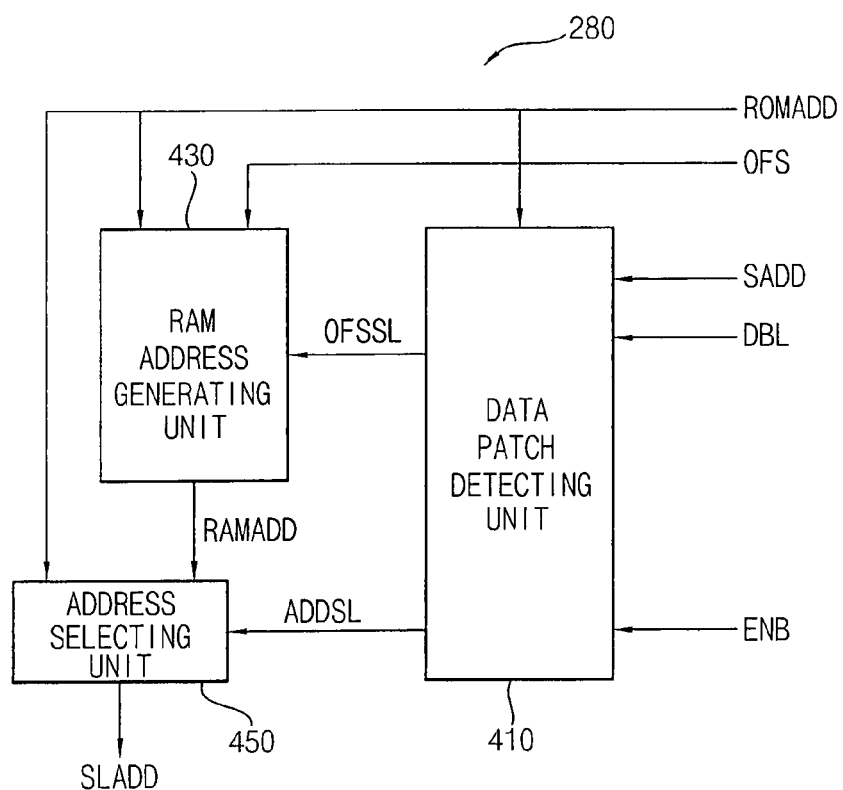
FIG. 4 is a block diagram illustrating a ROM data patch circuit according to an exemplary embodiment of the present invention.

FIG. 4 is a block diagram illustrating a ROM data patch circuit according to an exemplary embodiment of the present invention.

Referring to FIG. 4, the ROM data patch circuit 280 includes a data patch detecting unit 410, a RAM address generating unit 430 and an address selecting unit 430.

When a read command of the ROM data is received from the processor, the ROM data patch circuit 280 detects whether or not the read ROM data belongs to any of the N modified ROM data blocks 235, based on a read ROM address ROMADD and patch information SADD, DBL, OFS and ENB. The ROM data patch circuit 280 outputs the read ROM address ROMADD to the address bus when the read ROM address ROMADD does not belong to any of the N in modified ROM data blocks 235. Otherwise, the ROM data patch circuit 280 outputs a read RAM address RAMAUD, where the corresponding patch data are stored, to the address bus when the read ROM address ROMADD belongs to any of the N modified ROM data blocks 235.

The data patch detecting unit 410 outputs an offset select signal OFFSL and an address select signal ADDSL based on the read ROM address ROMADD, the start addresses SADD, data block length DBL and a patch enable signal ENB. The offset select signal OFFSL addresses which block among the N modified ROM data blocks the read ROM address belongs to, and the address select signal is used to determine which one of the read ROM address ROMADO and the read RAM address RAMADD is outputted from the address selecting unit 450.

The RAM address generating unit 430 generates the read RAM address RAMADD corresponding to the read ROM address ROMADD based on the read ROM address ROMADD, offset OFS and offset select signal OFSSL.

The address selecting unit 450 outputs one of the read ROM address ROMADD and the read RAM address RAMADD based on the address select signal ADDSL. For example, a selected address SLADD, which the address selecting unit 450 outputs to the address bus 260: may be the read ROM address ROMADD when the address select signal ADDSL is logic low and may be the read RAM address RAMADD when the address select signal ADDSL is logic high.

The address selecting unit 450 may include a multiplexer outputting one of the read ROM address ROMADD and the read RAM address RAMADD based in on the address select signal ADDSL.

Figure 5:
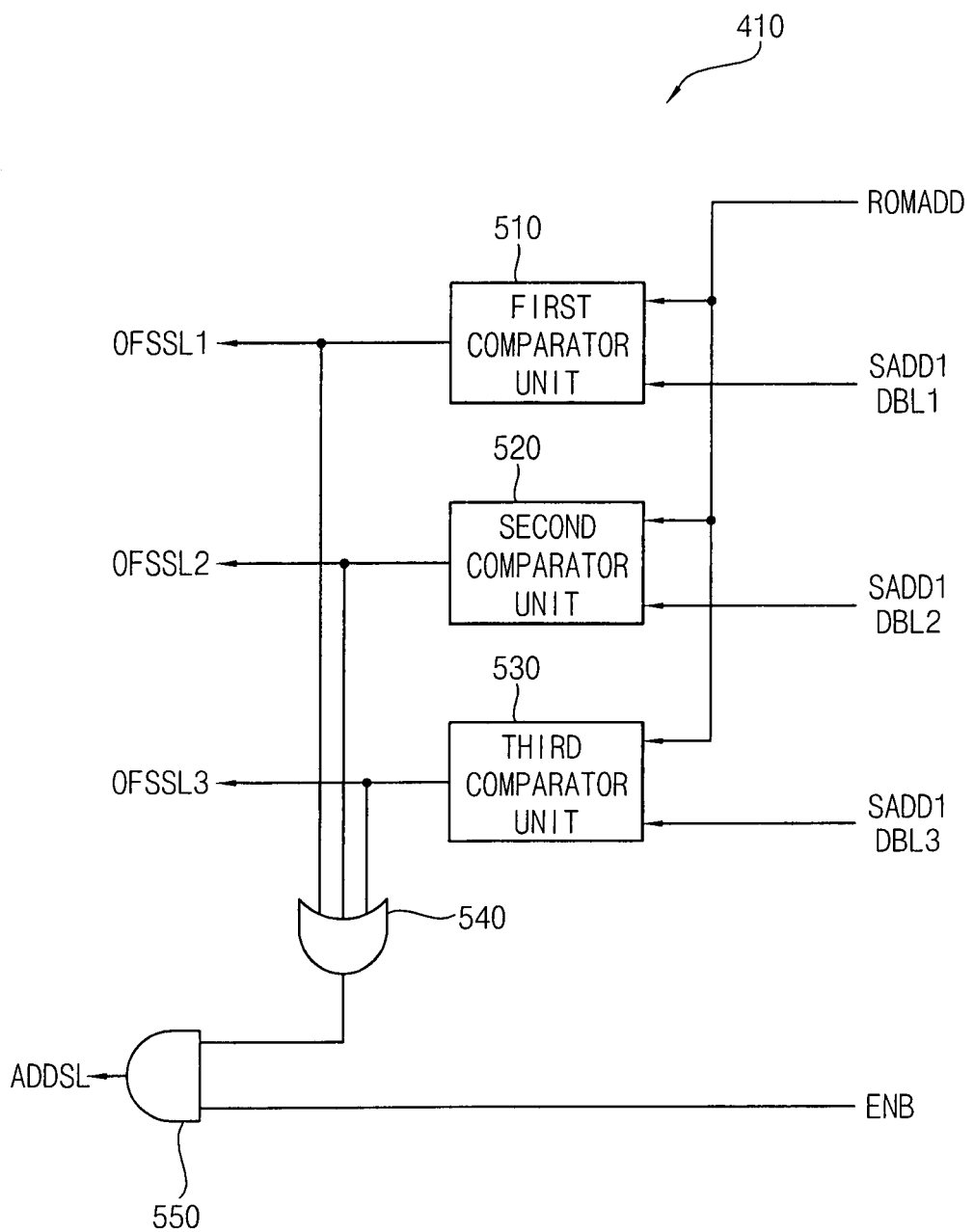
FIG. 5 is a circuit diagram illustrating a data patch detecting unit in FIG. 4.

FIG. 5 is a circuit diagram illustrating a data patch detecting 410 unit in FIG. 4.

The data patch detecting unit 410 includes first, second and third comparator units 510, 520 and 530: an OR gate 540, and an AND gate 550, Although three comparator units are described in FIG. 5, it will be understood to those skilled in the art that a different number of the comparator units may be implemented, for example, determined according to the number of the modified ROM data blocks including the ROM data to be modified.

The first comparator unit 510 generates a first offset select signal OFFSL1 representing whether or not the read ROM address ROMADD belongs to the first modified ROM data block, based on a first data block length DBL1 and a first start address SADD1 of the first modified ROM data block. For example, the first offset select signal OFFSL1 may be logic high when the read ROM address ROMADD is not less than the first start address SADD1 and not more than the sum of the first start address SADD1 and the first data block length DBL1, and logic low in other cases. The operations of the second comparator unit 520 and the third comparator unit 530 are substantially identical to the operation of the first comparator unit 510, and thus a description thereof is omitted.

When the read ROM address ROMAUD belongs to any the N modified ROM data blocks, an offset select signal among the offset select signals EFSSL1, OFSSL2 and OFSSL3 is, for example, logic high. The combination of the offset select signals indicates which block among the N modified ROM data blocks the in read RAM address belongs to. When the read RAM address does not belong to any of the modified ROM data blocks, all of the offset select signals are logic low.

The OR gate 540 performs an OR operation on the offset select signals OFSSL1, OFSSL2 and OFSSLS3. The output signal of the OR gate 540 may be logic high when the read ROM address ROMADD belongs to any of the N modified ROM data blocks, and logic low when the read ROM address ROMADD does not belong to any of the N modified ROM data blocks.

The AND gate 550 performs an AND operation on the output signal of the OR gate 540 and the patch enable signal ENB to output the address select signal ADDSL. When the read ROM address belongs to any of the N modified ROM data blocks and the patch enable signal is logic high, the address select signal ADDSL is logic high. When the read ROM address ROMADD does not belong to any of the N modified ROM data blocks or when the patch enable signal is logic low, the address select signal is logic low. As a result, the address selecting unit 450 in FIG. 4 outputs the read ROM address ROMADA when the address select signal ADDSL is logic low, and the read RAM address RAMADD when address select signal ADDSL is logic high.

The patch enable signal ENB is a signal for controlling a patch operation of the ROM data patch circuit. The patch enable signal is set to logic high when the ROM data are modified and logic low when the ROM data are not modified. Although the ROM data are modified, patching of the ROM data can be intercepted according to particular demands. That is, the address selecting unit 450 selects and outputs the read ROM address ROMADD when the patch enable signal is set to logic low, regardless of whether or not the read ROM address belongs to any of the N modified ROM data blocks.

Figure 6:
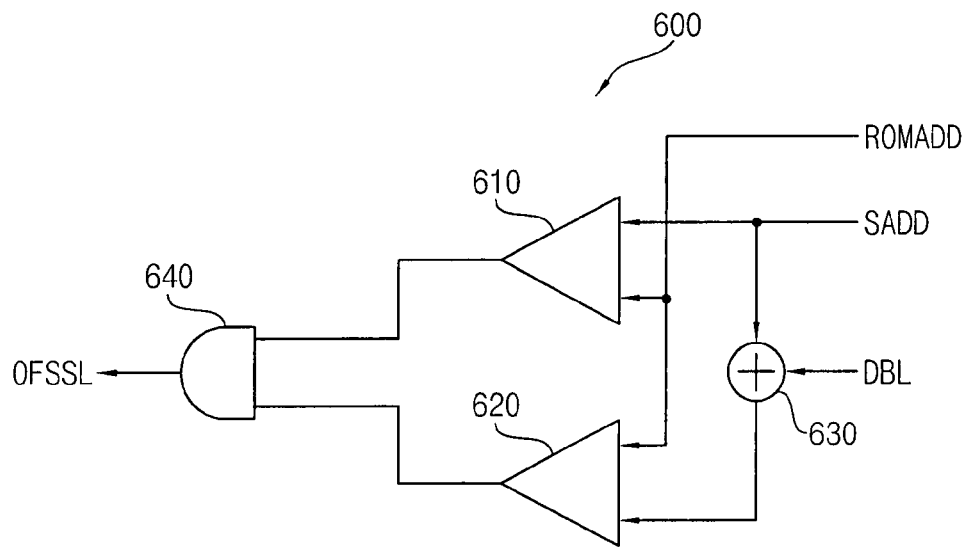
FIG. 6 is a circuit diagram illustrating a comparator unit in FIG. 5.

FIG. 6 is a circuit diagram illustrating an exemplary comparator unit of FIG. 5 e.g., 510.

Referring to FIG. 6, the comparator unit 600 includes a lower limit comparator 610, an upper limit comparator 620, an adder 630 and an AND gate 640.

The lower limit comparator 610 outputs a first signal of logic high when the read ROM address ROMADD is not less than a start address SADD, and logic low when the read ROM address ROMADD is less than the start address.

The adder 630 outputs a sum of the start address SADD and the data block length DBL.

The upper limit comparator 620 outputs a second signal of logic high when the read ROM address ROMADD is not more than the output of the adder 630, and logic low when the read ROM address ROMADD is more than the output of the adder 630.

The AND gate 640 performs an AND operation on the first signal and the second signal to generate the offset select signal OFSSL.

Figure 7:
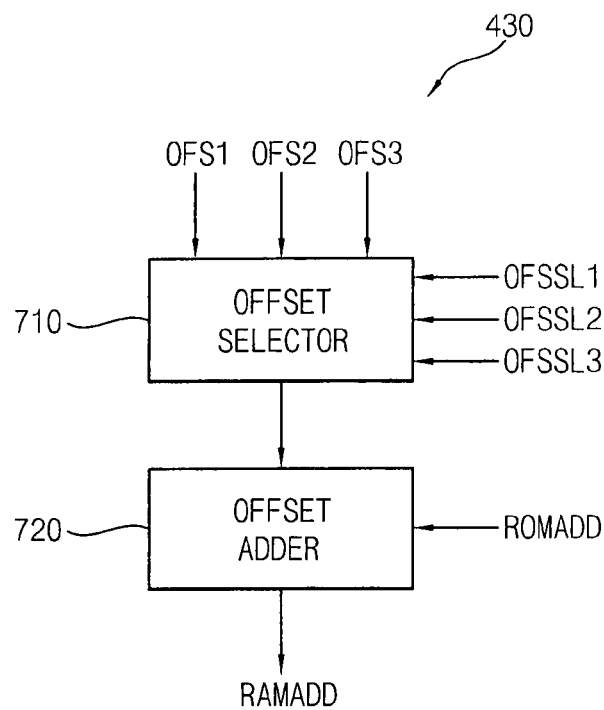
FIG. 7 is a block diagram illustrating a RAM address generating unit in FIG. 4.

FIG. 7 is a block diagram illustrating the RAM address generating unit 430 of FIG. 4.

Referring to FIG. 7, the RAM address generating unit 430 includes an offset selector 710 and an offset adder 720.

The offset selector 710 outputs the offset corresponding to the modified in ROM data block to which the read ROM address belongs, among the offsets OFS1, OFS2 and OFS3, based on the offset select signals OFFSL1, OFFSL2 and OFFSL3. That is, when the k-th offset select signal OFFSLK is logic high; the offset selector 710 selects and outputs the k-th offset OFSK to the offset adder 720, where K is 1, 2 or 3 in the above example.

The offset adder 720 outputs the read RAM address by summing the read ROM address ROMADD and the selected offset. The patch data for replacing the data stored at the read ROM address to be replaced, are stored at the read RAM address RAMADD outputted from the offset adder 720.

FIG. 8 is a flow chart illustrating a method of patching ROM data according to an exemplary embodiment of the present invention.

Referring to FIG. 8, the method of patching ROM data includes providing patch data and patch information for replacing the data stored in N (N is a natural number) modified ROM data blocks (block S810), storing the patch data in N RAM patch blocks respectively (block S820) and outputting one of a read ROM address and a read RAM address corresponding to the read ROM address based on the patch information and the read ROM address (blocks S830 to S860).

As described above, the patch information may include start addresses of the N modified ROM data blocks, data block lengths, offsets and a patch enable signal for controlling patch operation. Each of the offsets represents a difference between an address of the modified ROM data block and an address of the corresponding RAM patch block. The patch information may be stored in the in register unit 270 and used when reading data.

The patch data may be stored in a programmable ROM 220 that is disposed outside the embedded system 200 such as a flash memory, based on the result of a ROM test or according to the need to upgrade the ROM data. The patch data stored in the programmable ROM 220 are loaded in a RAM 240 during booting process of the embedded system (block S820).

N offset select signals are generated based on the start addresses of the N modified ROM data blocks and the data block lengths (block S830). The N offset select signal indicates which block among the N modified ROM data blocks the read ROM address belongs to.

An address select signal, which represents whether or not the read ROM address belongs to any of the N modified ROM data blocks, is generated based on the offset select signals (block S840).

The read RAM address corresponding to the read ROM address is generated based on the offset select signals (block S850).

One of the read ROM address and the read RAM address is outputted based on the address select signal (block S860). When the read ROM address belongs to any of the N modified ROM data blocks and the patch enable signal is logic high, the read RAM address is outputted. When the read ROM address does not belong to any of the N modified ROM data blocks or when the patch enable signal is logic low, the read ROM address is outputted.

As described above, in the ROM data patch device, the embedded system in and the method of patching ROM data according to embodiments of the present invention, errors of the ROM data may be modified and the ROM data may be upgraded using the patch data stored in the RAM without substantially degrading the system performance.

Therefore, the ROM data patch device, the embedded system and the method of patching ROM data according to an exemplary embodiment of the present invention may reduce time and cost for remanufacturing the system, by modifying the errors of the ROM data or by upgrading the ROM data with the patch data stored in the RAM.

While exemplary embodiments of the present invention and their advantages have been described in detail, it should be understood that various changes, substitutions and alterations may be made herein without departing from the scope of the invention.

What is claimed is:

1. A read only memory (ROM) data patch circuit for replacing ROM data stored in N modified ROM data blocks with patch data stored in N random access memory (RAM) patch blocks based on patch information, N being a natural number, the ROM data patch circuit comprising:

a data patch detecting unit configured to generate N offset select signals and an address select signal, the N offset select signals indicating which selected block among the N modified ROM data blocks a read ROM address belongs to;

a RAM address generating unit configured to generate a read RAM address corresponding to the read ROM address based on the N offset select signals and N offset signals, the N offset signals indicating a difference between an address of a corresponding selected block and an address of a of the patch blocks; and an address selecting unit configured to output one of the read ROM address and the read RAM address based on the address select signal, wherein the patch information comprises N start addresses of the N modified ROM data blocks, N data block lengths, N offsets and a patch enable signal for controlling a patch operation, each of the N offsets representing each difference between an address of the modified ROM data block and an address of the corresponding RAM patch block.

2. The ROM data patch circuit of claim 1, wherein the address select signal is logic high when the read ROM address belongs to any of the N modified ROM data blocks and the patch enable signal is logic high, and the address select signal is logic low when the read ROM address does not belong to any of the N modified ROM data blocks or the patch enable signal is logic low.

3. The ROM data patch circuit of claim 2, wherein the address selecting unit is configured to output the read ROM address when the address select signal is logic low, and to output the read RAM address when the address select signal is logic high.

4. The ROM data patch circuit of claim 1, wherein the data patch detecting unit comprises:
N comparator units configured to respectively generate the offset select signals, the offset select signal being logic high when the read ROM address belongs to a corresponding modified ROM data block and logic low when the read ROM address does not belong to the corresponding modified ROM data block;
an OR gate configured to perform an OR operation on the N offset select signals generated from the N comparator units; and
a first AND gate configured to perform an AND operation on the output signal of the OR gate and the patch enable signal to generate the address select signal.

5. The ROM data patch circuit of claim 4, wherein a K-th comparator unit of the N comparator units, K being a natural number, comprises:
a lower limit comparator configured to output a first signal of logic high when the read ROM address is not less than a K-th start address of the N start addresses;
an adder configured to output a sum of the K-th start address and a K-th data block length of the N data block lengths;
an upper limit comparator configured to output a second signal of logic high when the read ROM address is not more than the output of the adder; and
a second AND gate configured to perform the AND operation on the first signal and the second signal to generate a K-th offset select signal of the N offset select signals.

6. The ROM data patch circuit of claim 1, wherein the RAM address generating unit comprises:
an offset selector configured to output the offset corresponding to the modified ROM data block to which the read ROM address belongs among the N offsets based on the N offset select signals; and
an offset adder configured to output the read RAM address by summing the read ROM address and the offset outputted from the offset selector.

7. The ROM data patch circuit of claim 1, wherein the address selecting unit is configured to select and output the read ROM address when the patch enable signal is logic low, regardless of whether the read ROM address belongs to any of the N modified ROM data blocks.

8. The ROM data patch circuit of claim 1, wherein the address selecting unit comprises a multiplexer configured to output one of the read ROM address and the read RAM address based on the address select signal.

9. The ROM data patch circuit of claim 1, further comprising a register for storing the patch information.

10. An embedded system comprising:
a processor;
a data read only memory (ROM) configured to store data processed by the processor;
a random access memory (RAM) configured to store patch data for replacing the data stored in the data ROM;
a register configured to store patch information; and
a ROM data patch circuit configured to output one of a read ROM address of the ROM and a read RAM address of the RAM corresponding to the read ROM address based on the patch information and the read ROM address,
wherein the patch information includes a difference between an address of data within the ROM and an address of the corresponding patch data within the RAM,
wherein the ROM data patch circuit is configured to replace data stored in N modified ROM data blocks with patch data stored in N RAM patch blocks based on the patch information, N being a natural number, wherein the ROM data patch circuit comprises:
a data patch detecting unit configured to generate N offset select signals and an address select signal, the N offset select signal indicating which block among the N modified ROM data blocks the read ROM address belongs to, the address select signal representing whether the read ROM address belongs to any of the N modified ROM data blocks;
a RAM address generating unit configured to generate the read RAM address corresponding to the read ROM address based on the offset select signals; and
an address selecting unit configured to output one of the read ROM address and the read RAM address based on the address select signal,
wherein the patch information comprises N start addresses of the N modified ROM data blocks, N data block lengths, N offsets and a patch enable signal for controlling a patch operation, each of the N offsets representing each difference between an address of the modified ROM data block and an address of the corresponding RAM patch block.

11. The embedded system of claim 10, wherein the patch data are provided from an external programmable ROM and stored in the RAM during booting process.

12. The embedded system of claim 10, wherein the address select signal is logic high when the read ROM address belongs to any of the N modified ROM data blocks and the patch enable signal is logic high, and the address select signal is logic low when the read ROM address does not belong to any of the N modified ROM data blocks or the patch enable signal is logic low.

13. The embedded system of claim 12, wherein the address selecting unit is configured to output the read ROM address when the address select signal is logic low, and to output the read RAM address when the address select signal is logic high.

14. The embedded system of claim 10, wherein the data patch detecting unit comprises:
N comparator units configured to respectively generate the offset select signals, the offset select signal being logic high when the read ROM address belongs to a corresponding modified ROM data block and logic low when the read ROM address does not belong to the corresponding modified ROM data block;

an OR gate configured to perform an OR operation on the N offset select signals generated from the N comparator units; and a first AND gate configured to perform an AND operation on an output signal of the OR gate and the patch enable signal to generate the address select signal.

15. The embedded system of claim 14, wherein a K-th comparator unit of the N comparator units, K being a natural number not more than N, comprises:

a lower limit comparator configured to output a first signal of logic high when the read ROM address is not less than a K-th start address of the N start addresses;

an adder configured to output a sum of the K-th start address and a K-th data block length of the N data block lengths;

an upper limit comparator configured to output a second signal of logic high when the read ROM address is not more than the output of the adder; and the second AND gate configured to perform the AND operation on the first signal and the second signal to generate a K-th offset select signal of the N offset select signals.

16. The embedded system of claim 10, wherein the RAM address generating unit comprises:

an offset selector configured to output an offset corresponding to the modified ROM data block to which the read ROM address belongs among the N offsets based on the N offset select signals; and an offset adder configured to output the read RAM address by summing the read ROM address and the offset outputted from the offset selector.

17. The embedded system of claim 10, wherein the address selecting unit is configured to select and output the read ROM address when the patch enable signal is logic low, regardless of whether or not the read ROM address belongs to any of the N modified ROM data blocks.

18. The embedded system of claim 10, wherein the address selecting unit comprises a multiplexer configured to output one of the read ROM address and the read RAM address based on the address select signal.

19. A method of patching read only memory (ROM) data, the method comprising:

providing patch data and patch information for replacing the data stored in N modified ROM data blocks of the ROM;

storing the patch data in N random access memory (RAM) patch blocks, respectively; and outputting one of a read ROM address of the ROM and a read RAM address of the RAM corresponding to the read ROM address based on the patch information and the read ROM address, wherein the patch information includes a difference between an address of data within the ROM and an address of the corresponding patch data within the RAM, wherein the patch information comprises N start addresses of the N modified ROM data blocks, N data block lengths, N offsets and a patch enable signal for controlling a patch operation, each of the N offsets representing each difference between an address of the modified ROM data block and an address of corresponding RAM patch block.

20. The ROM data patch method of claim 19, further comprising storing the patch information in a register.

21. The ROM data patch method of claim 19, wherein outputting one of the read RAM address and the read ROM address comprises:

generating N offset select signals indicating which block among the N modified ROM data blocks the read ROM address belongs to;

generating an address select signal representing whether or not the read ROM address belongs to any of the N modified ROM data blocks;

generating the read RAM address corresponding to the read ROM address based on the offset select signals; and outputting one of the read ROM address and the read RAM address based on the address select signal.

22. The ROM data patch method of claim 21, wherein generating K-th offset select signal of the N offset select signals, k being a natural number mot more than N, comprises:

outputting a first signal of logic high when the read ROM address is not less than a K-th start address of the N start addresses;

outputting a second signal of logic high when the read ROM address is not more than a sum of the K-th start address and a K-th data block length of the N data block lengths; and generating a K-th offset select signal of the N offset select signals by performing an AND operation on the first signal and the second signal.

23. The ROM data patch method of claim 19, wherein outputting one of the read RAM address and the read ROM address comprises:

outputting the read RAM address when the read ROM address belongs to any of the N modified ROM data blocks and the patch enable signal is logic high; and outputting the read ROM address when the read ROM address does not belong to any of the N modified ROM data blocks or the patch enable signal is logic low.

* * * * *